United States Patent
Sherry (10) Patent No.: US 11,618,691 B1
(45) Date of Patent: *Apr. 4, 2023

(54) WASTE WATER TREATMENT TO REDUCE BOD/COD

(71) Applicant: Raymond C. Sherry, Cleburne, TX (US)

(72) Inventor: Raymond C. Sherry, Cleburne, TX (US)

( * ) Notice: Subject to any disclaimer, the term of this patent is extended or adjusted under 35 U.S.C. 154(b) by 110 days.

This patent is subject to a terminal disclaimer.

(21) Appl. No.: 17/182,049

(22) Filed: Feb. 22, 2021

Related U.S. Application Data (63) Continuation of application No. 16/433,503, filed on Jun. 6, 2019, now Pat. No. 10,927,014.

(51) Int. Cl.

| | |
|---|---|
| C02F 1/00 | (2006.01) |
| C02F 101/10 | (2006.01) |
| C02F 101/32 | (2006.01) |
| C02F 103/06 | (2006.01) |
| C02F 11/04 | (2006.01) |
| C05F 3/04 | (2006.01) |
| B01D 53/14 | (2006.01) |
| C02F 1/04 | (2006.01) |
| C02F 1/06 | (2006.01) |
| C02F 1/14 | (2006.01) |
| C02F 1/78 | (2006.01) |
| C02F 5/02 | (2006.01) |
| C02F 1/44 | (2006.01) |
| C02F 1/52 | (2006.01) |
| C02F 103/02 | (2006.01) |
| C02F 103/20 | (2006.01) |

(52) U.S. Cl.
CPC ............... *C02F 1/06* (2013.01); *B01D 53/14* (2013.01); *C02F 1/001* (2013.01); *C02F 1/048* (2013.01); *C02F 1/14* (2013.01); *C02F 1/78* (2013.01); *C02F 5/02* (2013.01); *C02F 11/04* (2013.01); *C05F 3/04* (2013.01); *C02F 1/441* (2013.01); *C02F 1/52* (2013.01); *C02F 2001/5218* (2013.01); *C02F 2101/10* (2013.01); *C02F 2101/322* (2013.01); *C02F 2103/023* (2013.01); *C02F 2103/06* (2013.01); *C02F 2103/20* (2013.01); *C02F 2303/04* (2013.01)

(58) Field of Classification Search
CPC ............... C02F 1/048; C02F 1/06; C02F 5/02
See application file for complete search history.

(56) References Cited

U.S. PATENT DOCUMENTS

| | | |
|---|---|---|
| 4,518,505 A | 5/1985 | Lim |
| 4,732,680 A | 3/1988 | Weaver et al. |
| 5,186,837 A | 2/1993 | Nikolic et al. |
| 5,445,741 A | 8/1995 | Dilla |
| 5,549,820 A | 8/1996 | Bober |
| 5,728,295 A | 3/1998 | Duan |
| 6,960,330 B1 | 11/2005 | Cox |
| 8,372,248 B1 | 2/2013 | Sherry |
| 9,133,043 B2 | 9/2015 | Matsuoka et al. |
| 9,238,181 B2 | 1/2016 | Clegg |
| 10,173,910 B2 | 1/2019 | Culler |
| 10,202,286 B2 | 2/2019 | Ertel |
| 10,322,956 B2 | 6/2019 | Whiteman |
| 2006/0096163 A1 | 5/2006 | Dickinson |
| 2010/0176064 A1 | 7/2010 | Batty et al. |
| 2011/0147283 A1 | 6/2011 | Taylor |
| 2013/0075329 A1 | 3/2013 | Culler |
| 2014/0144820 A1 | 5/2014 | Early |
| 2017/0204596 A1 | 7/2017 | Pandya |

FOREIGN PATENT DOCUMENTS

| | | |
|---|---|---|
| EP | 1547977 B1 | 11/2011 |
| FR | 2644771 A1 | 9/1990 |
| WO | WO-2013169091 A1 | 11/2013 |

OTHER PUBLICATIONS

Ye, Zhi-Long, et al. "Full-scale treatment of landfill leachate by using the mechanical vapor recompression combined with coagulation pretreatment." Waste Management 66 (2017): 88-96. (Year: 2017).*
Beauchard, FR 2644771 Machine Translation, 1990 (Year: 1990).
Manfred, EP 1547977 B1 Machine Translation, 2011 (Year: 2011).

* cited by examiner

*Primary Examiner* — Bradley R Spies
(74) *Attorney, Agent, or Firm* — Roger N. Chauza, PC (57) ABSTRACT

A waste water treatment system for removing contaminant chemicals, bacteria and organic matter to reduce the chemical oxygen demand (COD) and the biological oxygen demand (BOD). The system uses thermal energy to remove chemicals that can be oxidized to reduce the COD, and to destroy bacteria and organic matter to reduce the BOD of the treated water. The system can include an expansion chamber and a nozzle to create steam which can be used as thermal energy to heat the waste water and provide the proper treatment to reduce the COD and BOD of the processed waste water.

1 Claim, 3 Drawing Sheets

1. RO rejection brine concentrator/crystallizer system

2. Water softener rejection brine recovery system

3. Water softener via calcium removal system

4. Dirty water boiler system

5. Landfill leach BOD/COD reduction system

6. Biogas dewatering condensate BOD/COD reduction system

7. Sewage wastewater BOD/COD reduction system

8. Zero discharge (water reuse) system

9. Calcified water calcium removal system

10. Cooling tower water cycling extender

11. Animal wastewater reclamation system

12. Animal wastewater BOD/COD reduction system

13. Brewery wastewater BOD/COD reduction system

14. Dirty water steam stripper

WASTE WATER TREATMENT TO REDUCE BOD/COD

RELATED APPLICATION

This U.S. non-provisional patent application is a continuation of pending U.S. non-provisional application Ser. No. 16/433,503, filed Jun. 6, 2019, which claims the benefit of provisional application Ser. No. 62/763,209, filed Jun. 6, 2018.

TECHNICAL FIELD OF THE INVENTION

The present invention relates in general to the treatment of water to remove impurities therefrom, and more specifically to the treatment of water to reduce the biological oxygen demand (BOD), chemical oxygen demand (COD), and calcium.

BACKGROUND OF THE INVENTION

The contamination of water has gained much more attention in recent years, as water is now recognized as a precious resource. People have voluntarily made efforts to reduce the contaminants so that the water streams, lakes and the like are more compatible with long term use thereof. Governmental regulations have also been instituted to force both individuals and institutional users to become aware of the presence of contaminants and to reduce the same in the nation's water supply.

People have been educated and have learned over time that bottles, cans, cartons, bags, etc., should be disposed of properly so that such items do not contaminate the water supply. These items are easily handled and are visible so that they can be easily placed in waste containers or recycle containers and removed from the landscape. Other contaminants are not easily disposed of by household users, such as contaminants that are not visible and that dissolve in water. One of the most common contaminants that have been found to be extremely detrimental to the water sources is bacteria and the organic compounds that the bacteria feed on. Bacteria may not only be harmful to persons, but the organism is a contaminant that can destroy wildlife whose habitat is water. The oxygen needed for bacteria to ingest organic material removes the oxygen from the water (through biological or bacterial ingestion of organic material). Accordingly, there is less oxygen for fish and aquatic life. The more organic material that is ingested by the bacteria, the more oxygen is required to sustain the process.

Wastewater generated by consumers and institutions is made up of inorganic and organic substances. The organic substances that can contaminate the water supply are based on carbon and include fecal matter as well as detergents, soaps, fats, greases and food particles. Large organic molecule contaminants are often easily decomposed by bacteria, but require oxygen in the process. While this aerobic action is effective to break down the carbon molecules into harmless matter, the bacteria requires oxygen to thrive and break down the carbon-based contaminants into smaller molecules, and then into carbon dioxide and water. The amount of oxygen that is required for this decomposition process is known as the biochemical oxygen demand, or BOD. More accurately, biochemical oxygen demand (BOD, also called biological oxygen demand) is the amount of dissolved oxygen needed (i.e. demanded) by aerobic biological organisms to break down organic material present in a given water sample at certain temperature over a specific time period.

Nitrates and phosphates in a body of water can contribute to high BOD levels. Nitrates and phosphates are plant nutrients and can cause plant life and algae to grow quickly. When plants grow quickly, they also die quickly. This contributes to the organic waste in the water, which is then decomposed by bacteria.

The biological oxygen demand of wastewater can be measured and constitutes a test for the amount of organic material that is present in water. The amount of oxygen required is directly related to the amount of organic material present. The higher the biological oxygen demand, the greater the amount of organic material that is present in the water being tested. Stated another way, with a high the BOD value, there is a large amount of organic matter or food that is available for oxygen consuming bacteria. Wastewater that results in a high BOD value can deplete oxygen therein, and reduce the extent of oxygen in the water sources in which the wastewater is dumped. When the oxygen in the water supply is decreased, fish and other marine wildlife can die, as can marine vegetation. In other words, the ecosystem becomes less healthy and unless addressed, can be destroyed. In order to assure that the BOD value for wastewater is below a minimum that is allowed, a standard 5-day test can be conducted. A sample of wastewater is taken and then tested in a laboratory to determine the amount of oxygen consumed by the bacteria therein. In the event that there is an insufficient amount of bacteria in the test sample, then bacteria can be added to the sample. The maximum amount of oxygen that is allowed to be consumed by the bacteria is now set as 30 mg of oxygen per liter of water over the 5-day period. It is believed that legislation will eventually require a lower BOD value.

Fish breathe by absorbing dissolved oxygen through their gills. Oxygen can enter the water by absorption directly from the atmosphere, or by aquatic plant and algae photosynthesis. In order to sustain life for fish, there needs to be a sufficient amount of dissolved oxygen in the water. As noted above, oxygen is removed from the water by respiration and the decomposition of organic matter by bacteria. Moreover, a high level of dissolved oxygen in the drinking water is desirable because it makes the drinking water taste good. However, if the level of dissolved oxygen in the water is too high, this can be harmful to aquatic life, and can also be lethal. A high level of dissolved oxygen that is detrimental to fish is often known as gas bubble disease.

Bacteria oxygen demand (BOD) can be reduced in waste water by using various techniques. One popular method of reducing the organic material from waste water is by using lagoons as aerobic digesters. As bacteria feeds on the organic material, the organic material is removed. This reduces the BOD value by depleting the organic material prior to release of the waste water.

Bacteria is not the only water constituent that can deplete the supply of oxygen therein. Various chemicals can also reduce the oxygen content of the water supply. COD or chemical oxygen demand is the total measurement of all chemicals in the water that can be oxidized. The oxidation of materials requires oxygen. When a material is oxidized, it loses electrons and the oxygen gains the electrons.

The COD and BOD values of water can be reduced by adding hydrogen peroxide to the wastewater solution. The hydrogen peroxide chemically attacks the organics in the wastewater, degrading them and reducing the COD and BOD parameters. Hydrogen peroxide ($H_2O_2$) has been used to reduce the BOD and COD values of industrial wastewaters for many years. While the cost of lowering the BOD and COD values through chemical oxidation with hydrogen peroxide is typically greater than that through physical or biological means, there are nonetheless specific situations which justify the use of hydrogen peroxide. These situations include a) the predigestion of wastewaters which contain moderate to high levels of compounds that are toxic, inhibitory, or recalcitrant to biological treatment (e.g., pesticides, plasticizers, resins, coolants, and dyestuffs); and b) the pretreatment of high strength/low flow wastewaters where biotreatment may not be practical prior to discharge to a publicly owned treatment works; the enhanced separation of entrained organics by flotation and settling processes; and the supply of supplemental dissolved oxygen (DO) when biological treatment systems experience temporary overloads or equipment failure. As indicated by these examples, $H_2O_2$ can be used as a stand-alone treatment or as an enhancement to existing physical or biological treatment processes.

The COD of wastewater can be reduced by employing a precipitation process, e.g., coagulation and/or flocculation. According to this process, dissolved solids, or sludge, is treated with a chemical coagulant, such as PAC, $FeCl_3$ (ferric chloride) and alum. The sludge binds together so that larger clumps are made, which can then be deposited in a sedimentation tank. This can also be accomplished through electro coagulation, with various types of electrodes, including iron and aluminum.

COD reduction processes can also be carried out using bacteria or microorganisms. According to this process, aeration and anaerobic action is utilized. With regard to the aeration process, bacteria breaks down the organic compounds in the water. The bacteria are generally heterotrophic bacteria that break down organic compounds in the presence of oxygen. The anaerobic bacteria, on the other hand, work in the absence of oxygen, generally known as fermentation. Here, the bacteria break down autotrop working with organic compounds from the wastewater. In one stage of this latter process, oxygen is removed from the organic compounds.

The Fenton reaction has been widely known as being able to reduce the COD value of wastewater generated by refineries and other industries. The principle is the formation of free radicals that are created from the reaction between the Fenton reagent is $FeSO_4$ with hydrogen peroxide ($H_2O_2$). The Fenton reagent is well known to be very reactive, next to chlorine. The Fenton reagent chemistry uses $H_2O_2$ in the following manner:

$$Fe^{2+}+H_2O_2 \rightarrow Fe^{3+}+OH^-+\cdot OH$$

$$Fe^{3+}+H_2O_2 \rightarrow Fe^{2+}+OOH+H^+$$

The procedure requires a) adjusting the wastewater pH to about 3-5; b) adding the iron catalyst (as a solution of $FeSO_4$); and c) adding the $H_2O_2$ slowly. If the pH is too high, the iron precipitates as $Fe(OH)_3$ and catalytically decomposes the $H_2O_2$ to oxygen. The reaction rates with Fenton's reagent are generally limited by the rate of OH generation (i.e., concentration of iron catalyst) and less so by the specific wastewater being treated. Typical $Fe:H_2O_2$ ratios are 1:5-10 wt/wt, though iron levels <25-50 mg/L can require excessive reaction times (10-24 hours). This is particularly true where the oxidation products (organic acids) sequester the iron and remove it from the catalytic cycle. Fenton's reagent is most effective as a pretreatment tool, where the COD is greater than about 500 mg/L.

The advanced oxidation process (AOP) technology is able to reduce the COD of wastewater where the COD levels are above 100,000. The AOP technology is an improvement of the Fenton reagent which is carried out in the presence of ozone. This reaction produces free hydroxyl to oxidize chemicals in the wastewater. This process can be carried out more quickly than the microbiological reduction process, which can take days. The AOP technique can be completed in hours or minutes, and is not chemical intensive. Ozone can be generated by high intensity ultraviolet (via light sources and lasers) or electric discharge arching.

A water supply can be chemically treated with chlorine to destroy the bacteria, algae and other living organisms. While this technique works well, the chlorine treated water is detrimental to marine life and other living mediums of marine life when deposited in streams.

Other contaminants often found in water include salt and related calcium constituents. Calcium is essentially present everywhere and is easily entrained in water supplies. Salt is an earth compound and also finds its way into the water supply; including oceans and seas. Minerals are commonly removed from drinking water by employing typical water softening techniques which require the use of resin beads which collect the mineral deposits thereon. Once the resin beads have collected a maximum amount of the hardness mineral ions, such minerals must be removed from the beads. During a recharging cycle of the water softener, a salt brine is run over the resin beads to remove the hardness ions. The salt brine with the hardness ions therein is then discharged down the waste water drain, whether it be a home or business. The softener is then ready to soften more water. Concentrated solutions from Reverse Osmosis (RO) and ion exchange systems are being scrutinized more closely because of the concentrated residual waste stream that results therefrom. The concentrated waste stream is than drained into the sewer system which effectively transfers the problem to the municipal treatment plant for processing the same.

SUMMARY OF THE INVENTION

In accordance with the various features of the invention, disclosed is a waste water treatment system that employs thermal energy to either destroy organic matter on which bacteria feeds, or destroy both the organic matter as well as the bacteria, thus reducing the BOD value of the waste water. As a byproduct of the thermal processing techniques, fresh water can be produced.

According to another aspect of the invention, the COD of waste water can be reduced using thermal energy to precipitate the dissolved chemicals into a solid form which can be easily separated from the remaining waste water. Again, as a byproduct of the thermal processing techniques, fresh water can be produced.

A feature of the invention is that waste water having organic matter therein can be processed through the treatment system to separate the particulate matter therefrom, then separate any oil and/or volatile gasses, and lastly to pass the processed feed water through a heater where the it is heated and remains heated for a specified residence time to destroy the organic matter and the bacteria. The remaining liquid is pressurized and processed through an expansion chamber via a nozzle, so that the hot and pressurized liquid is flashed into steam, and condensed to produce fresh water.

With regard to a further feature of the invention, waste water laden with calcium and salt is processed through the treatment system, and through a heating stage which precipitates the calcium therefrom. The particulate calcium can then be filtered from the remaining feed water. The remaining feed water can then be pumped through the expansion chamber via a nozzle where the water is flashed into steam. In the flashing process, the salt precipitates into crystals which fall to the bottom of the expansion chamber where the particulate matter is removed.

The processing of waste water can be accomplished in the same water treatment system to reduce the BOD value of the waste water, as well as reduce the COD value of the waste water, thereby achieving an economy of apparatus. In addition, no chemicals are required for this process.

The water that is flashed into steam in the water treatment system can be condensed to produce fresh water. The fresh water can be used in boiler systems which require pristine water, as well as returned to steams or rivers, or used for irrigation purposes. Rather than condensing the steam into water, the steam can be used as a source of thermal energy for other industrial purposes.

According to an embodiment of the invention, disclosed is a method of reducing a BOD or COD value of waste water in a waste water treatment system. The process includes filtering the waste water to remove particulate contaminants, and heating the filtered waste water by thermal energy generated by a heater to a temperature to reduce at least one of a bacteria count or organic matter or calcium. Further processing includes treating the heated waste water by maintaining the heated waste water at the temperature for a sufficient time to assure that at least one of the bacteria count or organic matter or calcium is reduced, and disposing the treated waste water into the environment.

With regard to yet another embodiment, disclosed is a method of softening waste water in a waste water treatment system to remove dissolved calcium. The process includes using a heater in the waste water treatment system to heat the waste water to a temperature sufficient to cause the dissolved calcium to precipitate into particulate calcium, and then collecting the particulate calcium for disposal thereof. The waste water that remains after the calcium precipitation is returned to the environment.

In accordance with a further embodiment of the invention, disclosed is a method of treating waste water in a waste water treatment system to achieve zero discharge. The process includes heating the waste water with a source of heat that does not generate an environmental degrading emission, and heating the waste water sufficiently to destroy and remove contaminates therefrom. The process further includes processing the waste water so that a single byproduct thereof is water, and no environmental degrading emissions are created except water. The water is returned to the environment.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which.

DETAILED DESCRIPTION OF THE INVENTION

The system described below is well suited for processing many aqueous waste liquids, including that coming from the leach field of a landfill, municipal waste water plants, brine liquids and other liquids having salts and calcium, etc. As used herein, the input liquid that is processed through the system is termed "feed water."

Some of the processing stages described below are the same or similar to those disclosed in Applicant's patents, which are identified as: U.S. Pat. Nos. 7,963,459; 8,602,320; 8,915,453; 8,097,128; 8,372,248; 9,682,330 and 10,273,167. The subject matter of these patents is incorporated herein by reference thereto. One skilled in the art can thus find the details of the components of the present waste water treatment system by referring to the patents identified above.

Figure 1A:
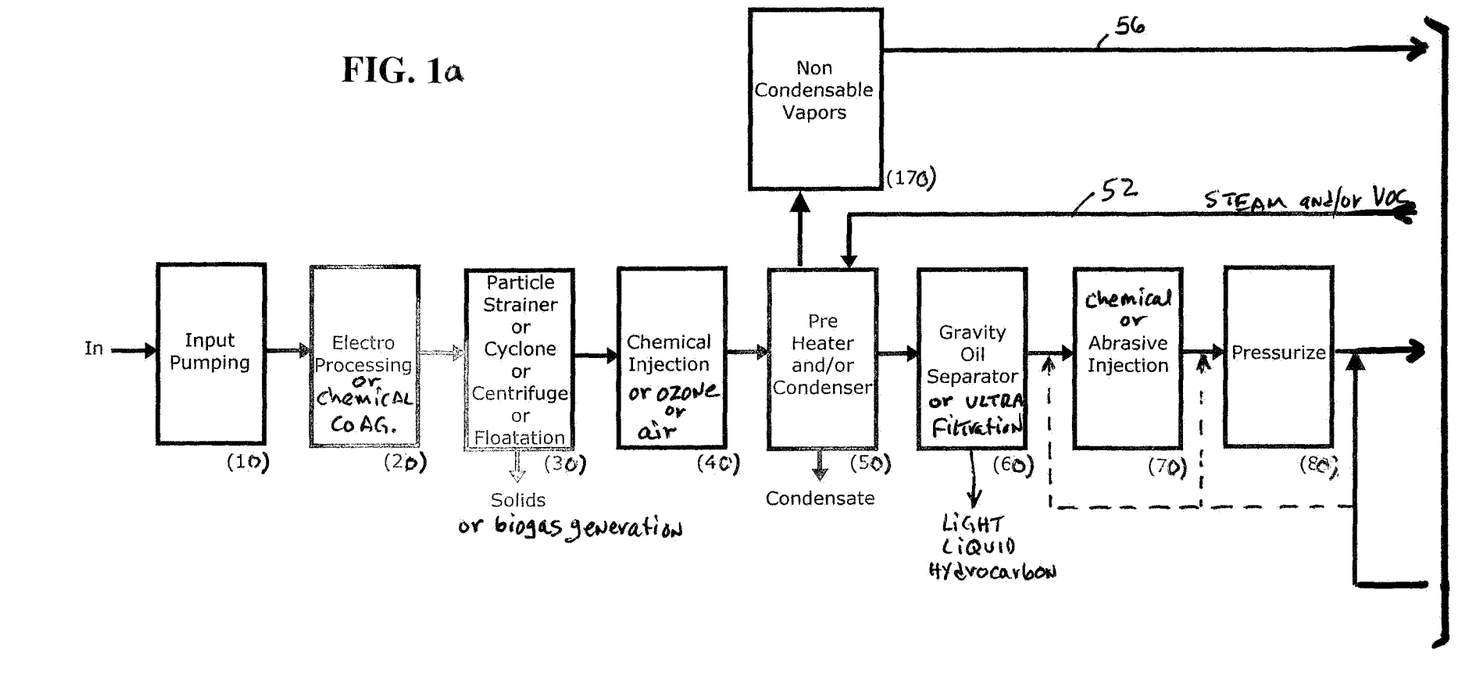
FIG. 1a is the frontal half of the liquid processing system of the invention.
Figure 1B:
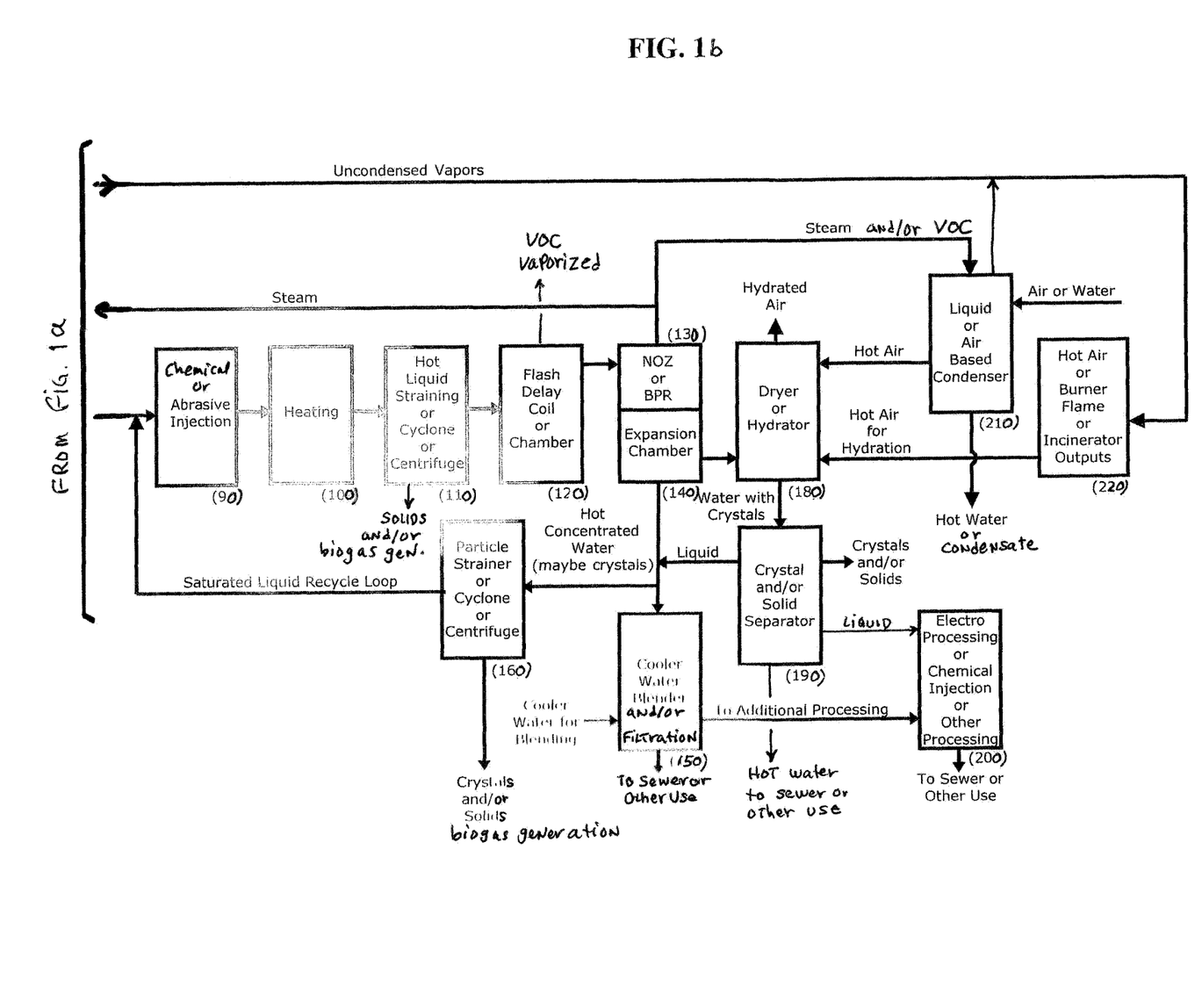
FIG. 1b is the rear half of the liquid processing system of the invention.
Figure 2:
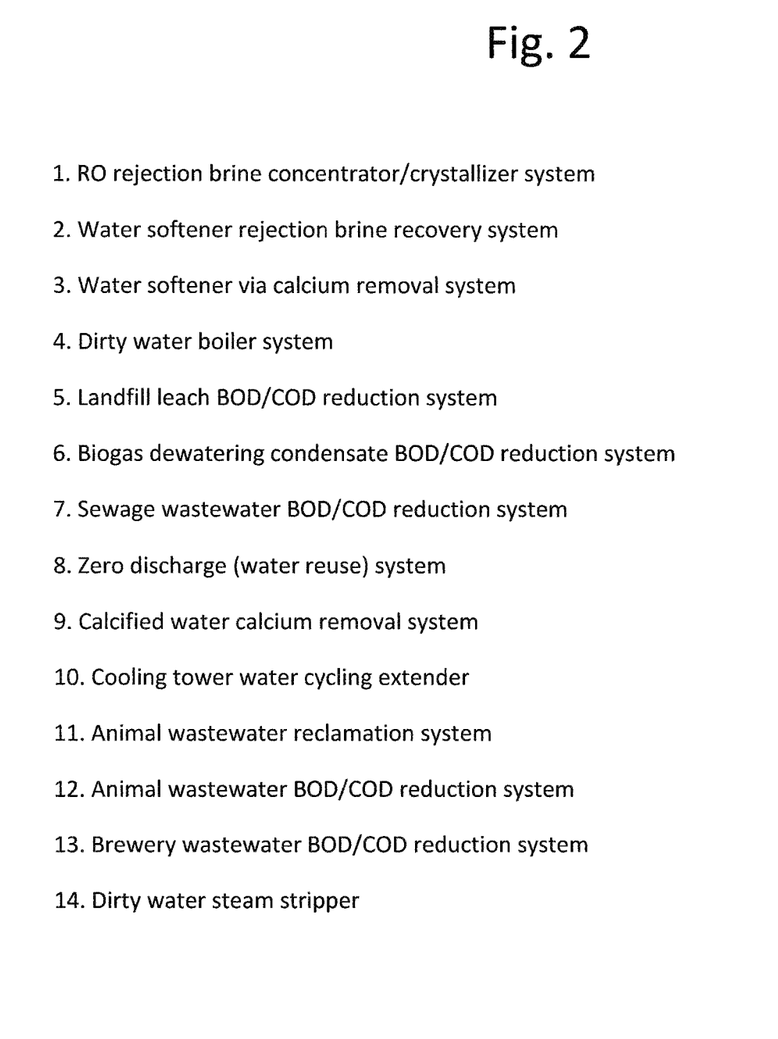
FIG. 2 illustrates a listing of the various uses of the waste water treatment system of the invention.

The description herein refers to FIGS. 1a and 1b. When placed together, these figures depict the various stages of the waste water treatment system of the invention. For fluids coming out of a tank, reservoir or other source, the input pump 10 functions to pump the feed water to the input of the system. FIG. 2 is a listing of the various uses of the system to process different types of waste water to remove impurities therefrom, or to destroy living organisms.

The electroprocessing stage 20 can be of the well-known electrocoagulation process, where steel, aluminum or graphite electrodes are used in an electrolysis tank, whereupon the material in the feed water coagulates and collects or lumps together. The coagulated matter that is heavier than water falls to the bottom of the tank, and the lighter material and liquids flow to the top of the tank which can be pulled out and separated. Other chemical coagulation techniques, such as chemical flocculation, can be employed. Depending on the wastewater being processed this could be an option.

Once the material in the input feed water has coagulated, it can be strained out by a strainer, cyclone or other type of centrifuge or floatation techniques 30 where the foam that floats on top of the liquid flows under an inverted weir, whereupon the floating liquid and solids remain behind. A side trap or exit can be formed at each end of the inverted weir so that the foam and other floating material can exit the chamber separately. The liquid water thus is separated from the foamy water with the weir. The solids or foam can thus be removed by the system and processed separately.

The chemical injection stage 40 can occur at the point in the system disclosed in FIG. 1a, but can also be utilized before the particle removal system 30. Chemicals can be injected into the feed water to control the pH thereof, such as sodium chloride, or other well-known chemicals to raise or lower the pH of the liquid. It can be appreciated that if the feed water is too acidic, such condition can be detrimental to the components of the system. If there is too much calcium in the feed water, then an acid can be injected to facilitate the removal of calcium, scale and other deposits. There are several techniques to carry out the chemical injection. It can be appreciated that the chemical injection apparatus 40 can be carried out at other locations of the system.

The preheater or condenser apparatus 50 uses steam generated by the back end of the system. There is illustrated the conduit 52 which carries steam from the expansion chamber of block 140, which is located at the back end of the water treatment system. The steam or other energy sources, such as a solar concentrator, electric and thermal combustion, can be used to preheat the incoming feed water, or as energy to condense vapors into liquids. The thermal energy generated by the solar concentrator can be used as heat itself, or to generate hydrogen for use as a fuel in a hydrogen burner, described below. In COD processing, the liquids lighter than the feed water, including lighter liquids such as toluene, vaporize at lower temperatures. The toluene and other light liquids will vaporize and be removed from the feed water when heated by the energy of the steam. The vapors are thus removed from the feed water and can be processed separately to dispose of the same, or to use the vapors as fuel for the burners 100 or 220. The volatile vapors that are not condensable are removed via stage 170 and coupled on line 56 to the burner or incinerator 220. The preheater 50 can include conventional heat exchanger apparatus, such as a one or more helical coils of tubing inserted in a container through which the feed water passes. The steam passed externally around the coiled tubes and heats the liquid that passes through the tubes. Preferably, the liquid enters the coils at the bottom and proceeds upwardly in the heat exchanger 50. With the steam passing around the coiled tubing in a top-down manner, the heat thereof will heat the feed water inside the coiled tubes sufficiently so that the light weight liquids will vaporize and rise to the top and be removed via stage 170. The liquid water separated in the preheater 50, i.e., the steam that has condensed into water, can be removed from the bottom thereof, as shown by the bottom arrow.

In addition, if there is any oil in the feed water, the oil will tend to separate from the water. In stage 60, the lightweight hydrocarbons are separated from the water content when heated by the preheater 50. The separator 60 can be any conventional separator of the type that separates oil from the more dense water. As such, the separator stage 60 could involve cyclone action or employ one or more other separation techniques. Also, ultra-filtration can be employed by the use of ceramic or other filtration media/systems, to remove emulsified hydrocarbons.

An abrasive can be injected into the system, as illustrated by the abrasive injector stage 70. Here, the abrasive is injected into the processed feed water and coupled to a pressure pump 80. The abrasive thus combines with the processed feed water until removed at the back end of the system. If a positive displacement pump is employed, then the abrasive 90 is injected after such type of pump 80. Otherwise when using centrifugal pumps, such type of pump can pump the processed feed water along with the abrasive. A 100-200 psi centrifugal and high volume pump can be used. For other applications, a positive displacement type of pump can pump the processed feed water with pressures of about 100 psi for high volume flow rates, or to about 5,000 psi with lower volume rates. Higher pressures may be necessary to keep lower boiling point liquids from vaporizing or flashing in the heating coil. A sonic or other density analyzer can be employed to monitor the state of heated liquid coming out of the burner coil to determine if a liquid has vaporized, and if so, then the pressure of the liquid processed through the heating coil can be increased accordingly to prevent the vaporization of the liquid. The abrasive can be utilized to clean the inside of the coil tubing that is heated in the heating stage 100. The heating stage 100 can comprise a gas burner that is capable of heating liquids to temperatures in the range of about 140 degrees F. to about 800 degrees F. It can be appreciated that the evaporation of water is a function of the heat energy introduced into the water flowing through the coil in the heating stage 100, not a function of the volume of water flowing therethrough. Thus, a high volume of processed feed water can be pumped by the centrifugal pump through the heating coil. When heated above the boiling temperature, a certain percentage of the processed feed water will flash into steam in stages 130 and 140. This is well known and is based on the temperature and the flow rate. Nevertheless, if more heat energy is added through the heating coil in the heating stage 100, more water will be flashed into steam. The heater in the heating stage 100 can be a gas burner (or electricity or other methods of adding energy to the water) that generates heat in which the coiled tubing is embedded. Rather than using gas as a fuel, flame heat, electric, microwave, solar, nuclear, waste steam, plasma, cavitation, chemical and other methods of heating the water can be employed.

When the processed feed water is heated to a higher temperature in the heating stage 100, then some minerals will start coming out of solution and precipitate into particulate matter. Some of the minerals may then start forming on the inner walls of the coiled tubing in the heating stage 100. The abrasive particles injected into the processed feed water will then prevent the particulate matter from accumulating on the walls of the coiled tubing. Various abrasive can be utilized, including ceramic particles, and various oxides including aluminum oxide. The injection of the abrasive material can be carried by any conventional techniques. The abrasive can be injected under pressure, or sucked into the system via venturi action. Moreover, a chemical can be injected at the front end of the heating stage 100 to dissolve the accumulation of any particulate matter forming on the inside surfaces of the coiled tubing. The turbulent nature of high velocity water flowing inside the coiled tubing can also reduce fouling, along with increased heating on the exterior of the heat exchanger, to induce flaking on the inside of the heat exchanger tubing. In addition, the fouling of the tubing can be reduced by limiting the number of flow paths for the liquid (or slurry) travel to as few as one path, rather than multiple paths from the inlet to the outlet. This structure insures that any blockage is known and quantified (pressure differential) and thus can be dealt with. Stated another way, if the pressure of the liquid transferred through the coiled tubing increases, then it is known that the single coiled tubing is fouled, rather than guessing which tube of a multi-tube heat exchanger is fouled.

The heating stage 100 can be of different types, including a double helix coil which goes down into the heating chamber and then back up to the top. In this configuration, an outer coiled tubing carries the processed feed water down an outer coil tubing, and then upwardly in an inner coiled tubing. As an alternative, a helical coil can be employed that simply goes from the top of the heating chamber and then proceeds to the bottom. If the feed water contains calcium ions in solution, the calcium will come out of solution at a specific temperature in the heating coil. If the feed water is being pumped upwardly in the heating coil, the particulate calcium will have to be lifted with the liquid within the coiled tubing, thus increasing the pressure within the coiled tubing. The pressure of the liquid in the coiled tubing increases because it takes energy to lift the particulate calcium in the tubing. A better alternative is to pump the feed water downwardly in the coiled tubing so that the particulate calcium is more easily carried by gravity with the hot feed water stream and will not have a tendency to clog up the heating system 100. It should be appreciated that many other types of heating techniques can be employed, such as simply a tank in which the processed feed water is heated, or otherwise.

It should be appreciated that when processing the feed water to address BOD and COD concerns, or the removal of calcium, simply heating the feed water for a predetermined period of time achieves an improved result. By increasing the feed water temperature, the bacteria and the organic material therein will be killed, the chemical vapors will be developed which can then be easily removed, organic compounds will be broken down, and/or the calcium will come out of solution and form particles which can then be removed from the system. It is believed that when the feed water is heated to at least 300 degrees F., calcium will precipitate and form particles. The feed water can be heated to a desired temperature for a predetermined time period to kill viral organisms, the type of bacteria that is present, without altering the beneficial enzymes. The burner in the heating stage 100 is the type which can elevate the temperature of the processed feed water to 700 degrees F., or higher.

As will be described below, the pressure of the feed water carried in the system is determined primarily by the orifice formed in the nozzle in the expansion chamber 130, and the pressure produced by the pump 80. If the pump 80 is of the positive displacement type, then when the dynamic orifice moves toward a closed position, the pressure within the system will increase. When a positive displacement type of pump is used, the pump speed also controls the flow rate of the feed water pumped. Reference it made to U.S. Pat. Nos. 7,963,459 and 10,273,167 for a complete description of variable orifice nozzles. In addition, the temperature of the feed water processed though the heater is a function of the pressure to which the feed water is held to maintain the processed water in the liquid state, rather than flashing to the vapor state. Also, if the residence time of the feed water passing through the heater is increased, the temperature of the feed water is increased, through more absorption of available heat energy.

The stage 110 is a separator that can be of various types for removing the solids formed in the heater stage 100. The larger particles can be removed by a strainer located just after the burner stage 100, by a cyclone device or a centrifuge. Although the dynamic/variable orifice nozzle 130 can handle particulate matter without clogging, it may be preferable to remove the larger particulate matter prior to being processed through the nozzle 130. The removed solids can be removed from the bottom of the separator stage 110. For example, when processing calcified water, the solution is heated to a temperature greater than about 300 degrees F., whereupon the calcium ions precipitate into particles, which can be removed prior to the nozzle stage 130. The decalcified water is then forced through the variable orifice nozzle 130 and flashed into steam. If the feed water also includes salt ions, then these can be separated after the nozzle 130 during the flash evaporation of the liquid in the expansion chamber 140. This allows for the calcium and the salt in the same solution to be processed together, but to be separated at different stages of the system. This is significant in the processing of the brine from a water softener, where the same is processed through the system of the invention. In this instance, the salt itself without the calcium is separated by the system and can be used again in the water softening process. The salt and the water can be reused by processing the solution once through the system of the invention.

The flash delay coil or chamber stage 120 of the system is constructed so as to allow the heated feed water to be maintained at a desired temperature for a desired amount of time to kill the bacteria and the organic material of concern in the feed water, or aid in cracking (breaking down) the organic material. For example, the heater can heat the feed water to a temperature of about 200 degrees F., and the delay coil 120 will maintain the feed water at such temperature for thirty seconds, as an example. The delay coil can be an insulated secondary helical coiled tubing or an insulated chamber to extend the time the feed water remains at temperature before being coupled to the nozzle 130. The length of the coiled secondary tubing, and/or the diameter of the secondary coiled tubing can also determine the residence time of the feed water flowing therethrough. Similarly, the volume of a secondary vessel determines the time the heated feed water remains therein until it passes through such vessel. In this instance, thermal energy is employed to kill the bacteria and the organic compounds so that the BOD value is reduced before returning the processed feed water back to a stream, river or the like.

The variable orifice nozzle 130 is contained within the expansion chamber 140. As an alternative to the variable orifice nozzle, in some instances it may be desired to utilize a back pressure regulator (BPR) when the feed water is essentially free of particulate matter. In the preferred embodiment, the nozzle 130 is situated in an expansion chamber 140 so that the heated feed water passing through the nozzle 130 is discharged into either an atmospheric pressure, or a lower pressure, in the expansion chamber 140. If the feed water is heated in excess of its boiling point, at the expansion chamber temperature, then steam is generated in the expansion chamber 140 irrespective of the use of a variable orifice nozzle or a BPR. The steam and any volatile organic chemicals (VOC) are removed from the expansion chamber 140 at the top thereof and carried back to the preheater, as described above. Alternatively, the steam can be switched with a suitable valve and coupled to a liquid or air-based heat exchanger/condenser 210, as illustrated, steam can be split and carried to both system components, or piped to other components to generate power and run machinery or used for heating purposes. This reuse of energy is a excellent technique to increase total system efficiency.

The liquid water separated in the preheater 50 can be removed from the bottom thereof, as shown by the bottom arrow. The output of the expansion chamber 140 is a more concentrated liquid and/or a crystallized compound. This is based on the percentage of flashed steam that is removed from the top of the expansion chamber. Also, since the vapors have been previously removed from the feed water, the liquid processed through the nozzle 130 is more dense and less likely to flash into the vapor state.

The concentrated water, particulate matter, crystals and other liquids that were not flashed in the expansion chamber 140 can go to various components or stages of the system. For example, the unflashed water and other liquids can be carried to a dryer or hydrator 180, to a cooler water blender 150 or to a particle strainer, cyclone or centrifuge stage 160.

In the event the processed feed water is concentrated with salt crystals, or other ions of interest, to the extent that no more crystals can be formed, then the particles or crystals can be removed in stage 160 by various techniques, including using a strainer or filter, cyclone techniques, or by utilizing a centrifuge. The crystals or particulate matter is removed from the bottom of the stage 160, and the remaining saturated liquid is carried via a recycle line back to the pressure pump 80. With subsequent removal of the water content via the steam, the liquid again becomes saturated and produces more particles/crystals, which are removed by the stage 160, and the cycle continues. If desired, make-up water can be added to the concentrated water. The make-up water can be inserted into the system at stage 60 or 70 by the use of mixing valves. Various mixing valves are available, including venturi type mixing valves. The saturated liquid is again pressurized and mixed with the incoming feed water and processed again through the system. As an alternative, the saturated liquid can be reprocessed through the abrasive injectors 70 or 90, as shown by the broken lines. Chemical injection can be employed for scale removal in the heat generating components or for pH balance. An acid can be added to remove calcium deposits and scale, and decrease the pH. Some particles/crystals can be allowed to remain in the saturated liquid to act as an abrasive to clean the heating coils. In other words, when straining out the particulate matter by size, a certain size of particles can be allowed to remain in the liquid as an abrasive. The particle size that is used as an abrasive will depend on the application to which the system is applied.

The hot concentrated water exiting the bottom of the expansion chamber 140 can also be routed to the cooler water blender 150. Cooler water from another source is also coupled to the blender 150. The cooler water can be excess water available from other industrial processes. Even though the hot concentrated water coming out of the expansion chamber 140 to the blender 150 may have dead bacteria and oxidized compounds therein, when mixed with the cooler water, the mixture is acceptable for dumping into the sewer system or other municipal facility, or use for irrigation purposes. If particle removal is required, then a strainer or other type of filtration system can be incorporated.

The water cooled in the cooler 150 can also be coupled to an electro-processing or chemical injection stage 200. Here, additional electrocoagulation can be carried out, as well as chemical processing. The pH can be adjusted, for example, other chemical additives can be added before pumping the same into a sewer, stream or lake. From stage 200 the processed liquid can be dumped into the sewer system, stream or used for irrigation purposes.

Returning now to the expansion chamber 140, liquid that has not flashed into steam is coupled to a dryer or hydrator stage 180. Hot air that is coming from the burner 220 can be used to vaporize the liquid and hydrate the same. Other hydration techniques can be utilized. Hot air from the liquid or air based condenser stage 210 can also be used to hydrate the liquid in the dryer stage 180. It can be seen that steam and/or VOC are carried from the nozzle 130 to the liquid or air based condenser 210. The objective of the dryer or hydrator stage 180 is to take the hot water from the expansion chamber and concentrate the water further and generate additional crystals without having to process the water back through the system. This is a very economical way of increasing the concentration of the water.

The water with crystals exiting the bottom of the dryer 180 is coupled to the crystal and/or solid separator stage 190. Here, more crystals are again removed. In the event that the crystals are salt, this salt is a very high grade salt, such as a salt used in the medical field that can be sold at a premium.

As noted above, a portion of the hot concentrated water from the expansion chamber stage 14 can be coupled to the particle strainer stage 160 and recycled so that eventually more crystals can be generated. Additionally, another portion of the hot concentrated water from the expansion chamber 140 can be coupled to the dryer/hydrator stage 180.

As noted above, the incinerator or burner of stage 220 is employed to destroy noxious vapors which are emitted from the non-condensable vapor stage 170, or from the liquid or air based condenser stage 210. In the event that there is no preheating in the frontal part of the system, but it is still desired to remove the VOC (volatile organic compounds), then the uncondensed VOC from the liquid or air based condenser stage 210 can be coupled to the burner or incinerator 220.

The following lists the various configurations in which the foregoing system can be placed to carry out specific operations to address BOD, or COD concerns, or waste water processing.

RO Rejection Brine Concentrator. Crystallizer System

In conventional Reverse Osmosis (RO) systems, a high pressure pump is employed to increase the pressure on the rejection side of the filter membrane and force the water across the semi-permeable RO membrane, leaving a certain percent of the dissolved salts, minerals, etc., or brine water behind in the rejection stream. The rejection stream is thus highly concentrated with the dissolved salts and constitutes an undesirable byproduct that must be disposed of in an environmentally safe manner. In commercial applications, the brine or concentrated water is no longer allowed to be discharged down a sewer drain. The system of the invention can be utilized to process the concentrated dissolved salts/brine water. The brine water would be coupled to either the abrasive injection stage 70 or the pressure pump 80 of FIG. 1a. As will be described below, the reject brine water from the RO filter would be processed so that the result is crystalline solid salt or other minerals. Chemical injection at stage 70 can be accomplished for scale removal in the heat generating components or pH balance. An acid can be added to remove calcium deposits and scale, and decrease the pH.

The reject brine water is then processed through stages 80-120 in the manner described above. The object is to remove all the water from the reject brine water so that only the solid crystals of salt are the result. All of the water is evaporated in stages 140 and 180. The crystalline salt comes out of stage 160, and can be used for road salt or other purposes. This process also allows for specific concentrations of minerals to be maintained in solution for easy transportation, disposal and/or processing.

Water Softener Rejection Brine Recovery System

Water softeners of many types are available. One type of water softener system is an ion exchange type of system where the hardness or calcium ions collect on beads which form a bed through which the water to be softened passes. Eventually, the calcium ions must be removed and flushed from the beads. Usually, salt water is passed through the bed of beads to remove the calcium ions, whereupon both the salt water and the ions are flushed down the sewer drain.

Rather than flushing the salt water and calcium ions down the drain, the waste product can be stored and processed later by the waste water treatment system of the invention. When processed through the system, the salty water does not need to be discharged down the municipal drains to thereby transfer the problem of treating the concentrated brine water to downstream water processors. The heavily laden calcium water can be pumped from a storage tank to the input of the water treatment system at the preheater and/or condenser stage 50. The calcium water is preheated in a top-down coil in the preheater 50. In other words, the calcium-laden water enters the coil at the top and proceeds downwardly in the preheater 50. When the feed water is heated to at least a temperature of 300 degrees F., the calcium will precipitate and be converted into particulate calcium. The preheated water with the particulate calcium is processed through the system and at stage 110, the particulate calcium is removed from the liquid content. The remaining liquid is processed through the nozzle 130. It can be appreciated that the variable orifice nozzle can easily process therethrough particles and not become plugged. When the hot liquid is sprayed through the nozzle 130, salt will crystallize and fall to the bottom of the expansion chamber 140, and the steam and other vapors are removed from the top of the expansion chamber 140 and coupled either to the preheater 50, or to the liquid or air based condenser 210, or both. The material at the bottom of the expansion chamber 140 can be coupled to the cooler water blender 150. From the cooler water blender 150, the water is not discharged into the sewer, but rather is either used by other processes, or recycled. The water is thus decalcified with the salt removed by the system. Calcium is removed at a stage prior to the nozzle 130, and salt is crystallized and removed after the nozzle stage 130. Both the salt and calcium crystals can also pass through the nozzle 130 and be separated by diluting the salt back to ionic form, because the calcium crystals will not easily return to iconic form by dilution in water, as does salt.

Water Softener Via Calcium Removal System and Calcified Water Calcium Removal System The system is configured much like that described above in connection with the processing of the water softener brine to remove calcium itself from the feed water. As noted above, the dissolved salt and calcium is removed from the liquid by processing the feed water or brine to cause the salts to precipitate into solid form, and then using equipment to separate the solids and particulate matter from the liquid portion. Calcified water is a byproduct of cement plants and other industries using cement in the fabrication of cementitious products.

The separation is the tricky part. The salt or calcium laden water is processed up to the hot liquids straining or centrifuge stage 110, which removes the particulate calcium matter before being processed through the nozzle 130. The feed water is heated by the preheater stage 50 which alone causes the calcium to precipitate and form particulate or crystalline solids. The solids can be pulled out in stages 160 or 190, including salt. When the remaining liquid is processed through the nozzle 130 and expansion chamber 140, the water content is converted to steam and removed. The salt crystals are then removed from the remaining liquid by the particle strainer of stage 160 or the crystal solid separator of stage 190. Thus, when processing feed water that contains both salt crystals and calcium, which is a typical industrial waste liquid, through the waste water treatment system of the invention, only a single pass is necessary in order to remove both chemicals.

It can be appreciated that when processing a brine which comprises salt and water, the hotter the liquid the more salt that can be dissolved therein before being saturated. Stated another way, the saturation point of a salt solution rises with the temperature of the liquid. The same is not the case with calcium. When calcium reaches a certain temperature, then all of it will come out of solution and precipitate into solid particulate form. The hotter the calcified water, the less calcium it will hold.

When the calcium laden water is heated in the preheater stage 50 it forms particles of calcium, which can function as a mild abrasive. As noted above, an abrasive carried by the stream of liquid through the system can clean deposits and residue from the inner surfaces of the various components of the system. The larger particles of the abrasive, deposits and residue can be removed by the particle strainer stage 110 and the remainder of the smaller particles carried by the hot liquid can then pass through the variable orifice nozzle 130 without adverse consequences.

The foregoing processing of the feed water cannot be accomplished in a conventional boiler. The formation of particles formed in a conventional boiler causes adverse results, as when the liquid is heated in the boiler tubes the liquid water flashes to a vapor, leaving the tubes fouled with mineral deposits. This is much like heating water in a pan on the stove. The water boils and goes from the liquid phase directly to the vapor phase. Any minerals in the water remain as deposits on the surface of the pan. This is the reason that boiler systems that create steam require very clean and pristine water with very little minerals or other chemicals therein. The minerals dissolved in the water used by a boiler system can form deposits on the inner walls of the boiler tubes, which necessitates periodic cleaning. What further exacerbates the formation of calcium deposits on the inner walls of the boiler tubes is the slow flowing water which is incapable of quickly carrying the calcium deposits through the tubes to the outlet. In contrast, the system of the invention causes the water to go into a vapor by flashing in the flash chamber 140. The water flow through the system is sufficiently fast that any particulate calcium that is formed is carried forwardly with the liquid. The system of the invention pushes the liquid via a pump at a high pressure and a high flow rate so that there is less likelihood of the calcium particles clinging to the inner surfaces. Also, only a single tubular path exists through the heating coil system for high fouling feed water. This is an advantage over multiple path heat exchanger systems. The single path heat exchanger system overcomes the problem with clogging tubes and damage to the tubes due to the generation of hot spots, because of the lack of water circulating through the clogged tubes. The overheated metal fatigues and results in premature heat exchanger failure. In those instances where the temperature of the burner stage 220 heats the feed water to a high temperature in the range of about 500 degrees F. to about 700 degrees F., the system functions similar to a self-cleaning oven where the thermal energy removes the particulate deposits from the inner surfaces to self clean the same. The more saturated the salt water is, the higher its boiling point. As a result, the pressure can be reduced for highly saturated solutions, or the temperature can be increased at the same pressure for cracking organic materials.

From the foregoing, in many instances it may be advantageous to operate the system of the invention so that the salt solution is fully saturated and recycled to the burner. As a result, only the makeup water needs to be preheated and the maximum crystalline salt is generated in the expansion chamber. Any calcium that may have been in the water is removed in previous stages and is not part of the saturated salt water that is recycled.

In practice, it has been found that the system of the invention is capable of removing calcium from calcified water having a concentration greater than 4,000 ppm to less than 10 ppm, with little effort.

Calcified Water Calcium Removal System

Here, the processed water after the calcium has been remove is reusable again by the industrial plant facilities that produced the waste water, or the reusable water is discharged directly into the municipal sewer system. The reuse of the processed water is illustrated by the arrow exiting the bottom of the block representing the crystal and/or solid separator stage 190. From stage 190, the processed water can be coupled to the cool water blender stage 150, as well as coupled to either the electro-processing or chemical injection stage 200. As can be seen, when processing the calcified water, it need not be processed through the nozzle 130, unless it is desired to create steam for preheating the feed water at the front end of the system. In any event, the nozzle 130 can still be used to regulate the liquid pressure of the system to maintain the liquid temperature for converting calcium ions to particles or crystals.

Dirty Water Boiler System

In any boiler system, the objective is to produce steam for use elsewhere. As noted above, boilers typically require very clean water for the source of the steam so that residue and deposits do not form on the boiler surfaces. It can be appreciated that the environment inside a boiler is well adapted for allowing deposits to develop on the internal surfaces which, if not eventually removed, lead to a substantial reduction in efficiency and ultimately unworkability. In contrast, the waste water treatment system of the invention does not require demineralized and/or the removal of organic chemicals and compounds, or very clean water to create steam, and thus does not flash steam in the heating coil where a heater heats a coil through which the water passes. The dirty water is flashed into steam after the heat coil, and at the output of the nozzle. The system can easily accommodate brine water or water with other minerals therein and process the same to create steam without the concern of the buildup of deposits. Even with feed water with crystals or other solid debris can be processed through the non-clogging nozzle so that fine filters are not needed. The dirty water can be processed to pull out the crystals and use them for other purposes. The steam generated in the expansion chamber 140 can be used in autoclaves or other normal uses of steam. When operating the system in processing highly saturated salt solutions, the boiling point of the saturated salt solution is higher, such as 235 degrees F., and the steam temperature exiting the expansion chamber is accordingly elevated.

Dirty water boilers produce steam and seed steam in a verity of processes such as thermal recompression, multi-effect evaporation and venturi mixing systems/nozzles. A steam stripper can be employed to heat a liquid containing volatiles. As a result, ammonia and other volatile compounds can be steam stripped without the need for a conventional boiler which requires pristine water.

Another example is in the industry where cement products are fabricated, and the undesired byproduct is calcified water. This industry uses large volume autoclaves to cure the green cement products which can be cementitious sheets of reinforced cement. Here, the system of the invention can be employed to remove the crystals of calcium, resulting in a cleaner form of water. The resulting water can then be further processed through the system to create steam for use in autoclaves which cure the cement products. The curing process can take hours. Otherwise, the calcified water left over in fabricating the green cement products would be discharged into the sewer system. Many municipalities charge a premium for discharging calcified water in the sewer system. In some cement product businesses, it is not unusual for a million gallons of city water to be used each day in making the products. This can be costly to simply dispose of the calcified water in the city sewer system. In situations where there is an on-site boiler to generate steam, the waste water treatment system of the invention can be utilized to preheat the water for the boiler, and/or the system of the invention can add to the volume of steam generated by the boiler for plant processes.

Landfill Leach BOD/COD Reduction System/Biogas Dewatering/Sewage Wastewater

Landfills are locations where waste materials, garbage from home and industrial locations, and many other wastes are deposited and then compacted. Garbage trucks carry the garbage to the landfill, and caterpillars are used to spread out the trash and pack the same. Landfills can result in small mountains of material that decomposes over time. The depositing of garbage and compacting continues until the area is full. A landfill can cover many acres and accumulate many tons of garbage. The organic material in a landfill decays over time, whereupon liquids and gases are generated. The liquids leach out of the landfill and unless taken care of, run into the creeks, rivers, lakes, etc. The gases escape into the atmosphere and often are toxic and have a nauseating smell.

It is now becoming customary to collect the gases from the landfill before they escape into the atmosphere and use the same as a fuel to power an engine or turbine which drives an electrical generator. The gas can also be burned off using a flue stack, where the heat therefrom can be used in a system to concentrate the liquid that leaches out of the landfill. The electricity generated by one of these facilities is known as "green energy" and can be sold at a premium.

The liquids that seep from the landfill have bacteria and organic matter therein to the extent that such water can no longer be discharged into the water supply system. In any event, the liquids discharged from the landfill can be processed through the waste water treatment system of the invention. At stage 120, long heating coiled tubes can be utilized to increase the residence time in which the leech water remains at an elevated temperature. It is believed that when processing leech water to reduce the BOD/COD test results, the residence time would be about 30-300 or more seconds, at a temperature of about 300 degrees F., or more. This would be sufficient to significantly reduce the bacteria and organic material content of the leech water so that it can be safely discharged in streams and rivers. It should be appreciated that when processing leech water through the system, the calcium and salt content is also removed in the same manner described above. Other particulate matter is also removed and filtered out. Again, when treating leech water, when sprayed through the nozzle 130 to flash the water content, the steam can be fed back to the preheater stage 50 to preheat the leech water to thereby facilitate the separation of any oil therein in stage 60. The primary aim is not to generate steam, but to heat the leech water to a desired high temperature for a sufficient period of time so that the bacteria and organic material is killed, and also to facilitate the cracking or breaking down of the organic compounds.

When generating electricity using the gasses generated in the landfill, there is also generated biogas that can be processed through the system to dewater or dry the gas which provides the advantage of a higher BTU per cubic foot of fuel.

The same or similar processing can be utilized in processing agriculture wastewater for reclamation, agriculture wastewater BOD/COD reduction, and brewery wastewater BOD/COD reduction.

For COD reduction, it is appreciated that certain chemicals in the water require oxygen to oxidize, which should not be discharged directly into the streams and rivers, as this would decrease the oxygen necessary to maintain marine and vegetation life. The COD reduction chemicals are typically oxidizers. The oxidizing of such chemicals is a natural process and continues until the oxygen in the water is entirely depleted. The COD is reduced by removing the chemicals and/or the pre-oxidizing the organics in the waste water being treated. The chemicals can be removed in either of the condensers, where there may be multiple temperatures over the condensers, i.e., a multi-tiered condensing system. This would be a concept similar to a petroleum cracking plant. In the event that some of the chemicals want to recombine with the water, they can be cooled off at a higher temperature to retard recombination. Each of the stages 50 and 210 can be constructed using multi-temperature stages, again much like a cracking tower where the highest temperature is at the top and the lowest temperature is at the bottom. For example, the highest temperature can be 400 degrees F. and the lowest temperature can be that of the boiling point of water, namely 212 degrees F. As the chemicals are pulled off in the multi-temperature condensers, they are relatively pure and can be reused, or the removed chemicals can be burned in the incinerator 220. It should be noted that the oxidation of the various compounds can be carried out using ozone generated by conventional means.

With the accelerated heating of the waste water in the system of the invention, the organics can be broken down into lighter vapors further oxidizing compounds and/or particulate matter of a simpler molecular structure. The burner 100 can be capable of generating two million BTU, and more, which is sufficient to heat the liquid to produce both vapors and particulate matter. The solids can be filtered out, or further processed to turn them into a lighter form of themselves. The vapors can be removed from the top of the flash delay coil 120, as illustrated in the drawing. It can be appreciated that when the volatile organic compounds are released from the flash delay coil 120, the pressure therein is not decreased as the variable orifice nozzle 130 will automatically make the proper orifice adjustment to maintain the system pressure at the desired amount, upstream from the nozzle 130. For example, if a natural gas is formed in the flash delay coil 120, it will be a gas which can be released into a container and stored as a fuel, or used directly to fuel the burner 100. Organic solids recovered from wastewater streams can be used to make biogas, charcoal, fertilizer or burned/incinerated to reclaim the heat energy.

In some situations it may be practical to separate volatiles recondensed with the steam into a liquid, and subsequently process the liquid through a carbon filter, RO or chemical as a side stream. This eliminates the need for expensive packed column designs for separating VOC by boiling points. With this approach the reduction of BOD and COD reducing compounds can be focused on and not the isolation of specific volatile compounds. The process can be carried out at the output of either stage 50 or 210.

Cooling Tower Water Cycling Extender

Cooling towers typically include apparatus over which hot water passes to cool the water. The heat from the water is transferred to the dry air by evaporation. Water is evaporated as part of the cooling process, and this evaporation increases the concentration of the recycled water until it is too concentrated to use. However, like the other situations described above, the chemicals and minerals in the hot water to be cooled can collect on the apparatus and form unwanted deposits and residue. Here, the chemicals and particles can be removed in a manner much like that described above in connection with the water softener via calcium removal system.

Zero Discharge (Water Reuse/Gas Stripping) Systems

In this application, the waste water is processed down to a solid. The dirty water can be for example, water with salt and/or calcium therein, salt water from a well or rejection water from an RO system. The reject water from an RO system can be processed in the system of the invention so that the only item that remains is a solid. The water content is hydrated into the air. Some combination of the stages will be employed to process the reject RO water to form a solid. A "zero discharge" system is known as a system that reuses all of the water that is involved in the particular manufacturing process, and no liquid is left over for disposal thereof. No liquid is discharged down a sewer drain or stored for later disposal thereof at a disposal plant. Depending on the kind of water, the system would be configured to remove all of the liquid content. The water content can be heated and flashed into steam to thereby remove the water part of the dirty water. Salts and calcium can be removed by the techniques described above. When heated, the volatile organic compounds will vaporize and can be removed from the system as a gas. The undesirable BOD and COD generating compounds can be removed so that the remaining purified water can be used for agriculture or gardening purposes without discharging the water down a drain.

In addition to zero water discharge, combustion gas stripping can also be accomplished using the wastewater stream as a stripping medium, in an effort to reduce burnt combustion and VOC gases (emissions) from polluting the air. The possibility for zero emissions systems lies within this method.

Yet another technique that constitutes a zero emission system employs a burner that uses hydrogen as a fuel. In this waste water treatment system, a hydrogen gas is used as the fuel for the burner, and when the hydrogen is mixed with the air or oxygen and ignited, a combustion occurs which creates heat. It is essential that a water mist be used with the hydrogen and oxygen combustion to control the burn rate so that an explosion does not occur. The water content in the mist requires heat to evaporate the water, thus slowing down the hydrogen burn rate so that combustion can be controlled. The water mist can be injected into the hydrogen/oxygen mixture by a mist nozzle, or the like. The water is effectively atomized so that the hydrogen combustion process is slowed down and thus controlled. It is appreciated that the combustion of hydrogen and oxygen produces water as a byproduct, thus constituting a zero emission system. No fumes are generated from the hydrogen combustion.

The waste water can be passed through the hydrogen burner so that the heat generated by the hydrogen burner can be employed to destroy bacteria therein, as well as organic matter. If the waste water contains calcium or salt, then such compounds will also be crystallized and fall to the bottom of the hydrogen burner. To that end, the hydrogen burner functions as an incinerator for volatile organic compounds, as well as material in the waste water that either burns directly, or burns when converted by the heat to particulate matter. If any particulate matter results from passing the waste water through the hydrogen burner, such particulate matter can be removed from the bottom of the burner.

The efficiency of the hydrogen burner can be improved by passing the waste water through the nozzle and atomizing the waste water to control the burn rate of the hydrogen fuel. The water content of the waste water is used to control the burn rate, while the bacteria, organic matter, calcium, salt and other mineral are incinerated and disposed of. The only byproduct is the water that results from the burning of hydrogen in the presence of oxygen.

Animal Wastewater Reclamation System

Many farms and agricultural enterprises raise animals for providing meat and related products to consumers. Animals generate wastes that must be disposed of, especially when the animals are numerous and are raised in close quarters. Feed lots and dairy farms are examples, as well as chicken farms. The animal wastes themselves must be disposed of, as well as the water that is used to wash the animal stalls and milking stations, etc. Many farms have holding ponds that initially hold the manure and other wastes from animals which drain therein, as well as when rain washes the wastes into the ponds. As can be appreciated, these waste liquids can be an environmental hazard and must be disposed of in a safe manner.

The waste water treatment system of the invention can be situated on site, or the animal waste water can be trucked to a facility in which the system of the invention can process the same to produce safe byproducts. The particle strainer of stage 30 would be utilized to remove the large amounts of particulate matter, where the solids can be placed in a container and disposed of in the proper manner, or used for biogas generation or to produce fertilizer. The water content of the waste water that is separated from the particulate matter, and after removal of any salts and calcium, can be reused by the agriculture facility to again wash down stalls, etc. The undesirable BOC/COD generating compounds can be reduced in the same manner described above.

With regard to the back end processing by the waste water treatment system of the invention, one can remove much of the salts from the liquid, but some may remain. In this case, some of the salts can get through the demisting filters into the steam when steam is generated by the discharge of hot water from the nozzle 130. In this case, an RO system can be placed in the back end of the system to remove the remaining salts. Clay filters and other types of filter mediums can be utilized. With this feature, the added filtering can remove the minerals to very low concentrations or ppm's. The same can be accomplished when processing crystals to further remove the crystal content of the liquid. For example, when forming crystals of salt, it may be desired to further process the salt to provide a medical grade of salt for use in saline solutions, etc.

From the foregoing, those skilled in the art can reduce the BOD or COD values of a liquid by using one or more of the thermal techniques described above, rather than employing chemical and other complicated well known techniques. The organic compounds in water are thermally destroyed so that the food that supports bacteria is depleted, thereby reducing the BOD value. When the bacteria are starved of food, they die and the water is made safer for fish and other marine life, as well as safer to drink. The COD value of waste water can also be reduced using one or more of the thermal techniques described above.

While the preferred and other embodiments of the invention have been disclosed with reference to specific components of a waste water processing system, and associated methods of fabrication thereof, it is to be understood that many changes in detail may be made as a matter of engineering choices without departing from the spirit and scope of the invention, as defined by the appended claims.

What is claimed is:

1. A method of reducing a BOD or COD value of landfill leachate in a waste water treatment system, comprising:
   filtering the leachate to remove particulate contaminants;
   heating the leachate by thermal energy generated by a heater to a temperature of about 300 degrees F., or more, for a period of time of about 30-300 seconds to reduce the bacteria count and kill the organic material, and to remove calcium and salt content of the leachate;
   processing the heated leachate through a nozzle to flash the water content into steam; and
   disposing the treated leachate into the environment.

* * * * *